US007645818B2

(12) United States Patent
Jong (10) Patent No.: US 7,645,818 B2
(45) Date of Patent: Jan. 12, 2010

(54) MATERIAL COMPOSITIONS FOR REINFORCING IONIC POLYMER COMPOSITES

(75) Inventor: Lei Jong, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/823,648

(22) Filed: Jun. 28, 2007

(65) Prior Publication Data

US 2008/0004376 A1 Jan. 3, 2008

Related U.S. Application Data

(63) Continuation of application No. 10/977,988, filed on Oct. 29, 2004, now abandoned.

(51) Int. Cl.
*D21H 19/50* (2006.01)
*B32B 5/16* (2006.01)
(52) U.S. Cl. .............................. 524/17; 524/47; 524/48; 524/50; 525/56; 428/327; 428/402; 427/212
(58) Field of Classification Search ....................... None
See application file for complete search history.

(56) References Cited

U.S. PATENT DOCUMENTS 3,682,646 A * 8/1972 De Paolis .................... 426/46
5,667,885 A * 9/1997 Nguyen et al. .............. 428/327

OTHER PUBLICATIONS

Dow Technical Data for CP 620 NA binder, pp. 1-2.*

* cited by examiner

*Primary Examiner*—Vasu Jagannathan
*Assistant Examiner*—Gennadiy Mesh
(74) *Attorney, Agent, or Firm*—John Fado; Randall E. Deck; Lesley Shaw (57) ABSTRACT

The invention is related to the preparation of an ionic polymer composite material comprising a protein and carbohydrate-containing vegetable material component that serves as a reinforcement agent for the composite. In preferred embodiments of the invention, the vegetable seed component is selected from the group of soy spent flakes, defatted soy flour, or soy protein concentrate with ionic polymers and the ionic polymer is carboxylated poly(styrene-butadiene). The composites have a significantly higher elastic modulus when compared with base polymer.

11 Claims, 9 Drawing Sheets

MATERIAL COMPOSITIONS FOR REINFORCING IONIC POLYMER COMPOSITES

BACKGROUND OF THE INVENTION

1. Field of the Invention

The invention is related to the preparation of an ionic polymer composition comprising a protein and carbohydrate-containing vegetable material component, such as soy spent flakes, defatted soy flour, or soy protein concentrate. The composite composition is formed by incorporating soy spent flakes, defatted soy flour, or soy protein concentrate composition with ionic polymers. The composites have a significantly higher elastic modulus when compared with base polymer.

2. Description of the Prior Art

Soybean is composed of approximately 20% soybean oil, 8% hulls, and 72% defatted soy flour. Soybean also contains very little or no starch. Traditional approaches to the art of soybean processing involve appropriate preparation of the soybean prior to solvent extraction. After cracking of the beans and subsequent separation of the hull from the kernel portions, the cracked kernels are steam conditioned in large pressure cookers called bean conditioners that are located upstream from a flaking mill. The flaking mill functions to squeeze and impart a slight shear to the steam conditioned kernels resulting in the formation of a thin meal flake having a diameter of around 0.50 inch and a thickness of about 10-16 mils. After the meal has been flaked, the traditional approach is to route the flaked meal to a further heat processing step or directly to extraction processes. This further heat processing step may occur within a jacketed screw press conveyor with steam being injected into the working section of the conveyor. The flakes are there steam treated and are mechanically worked. The meal exiting the die orifices of the screw conveyor can best be described as including dust-like particles that are combined in the form of a pellet or pellets. After the flaked, steam treated pellets exit the second heating step, they are sent to extraction processes including extractors, desolventizer-toasters, dryer-cooler, meal grinding and meal storage stations. During these processes, the meal is mixed with a solvent, such as hexane, which dissolves the soybean oil. The soybean oil-solvent mixture is then separated from the meal particles. The desired soybean oil may then be isolated from the solvent solution by conventional techniques such as distillation, etc. The meal itself is desolventized, dried and then ground and stored prior to use.

After the hulls are removed and soybean oil is extracted, the remaining material is called defatted soy flour, which is composed of soy protein and soy carbohydrate. (*Protein Resources and Technology,* 1978) The defatted soy flour usually contains more than 50 percent soy protein. The defatted soy flour can further be processed to separate soy protein from soy carbohydrate. The separated soy protein usually contains more than 90 percent protein and is called soy protein isolate. Soy carbohydrate contains a soluble fraction called whey and an insoluble fraction called spent flakes. The defatted soy flour can be further subjected to acidic treatment to separate the whey from the protein and insoluble carbohydrate. The remaining material after whey removal is called soy protein concentrate containing more than 70 percent protein. The protein and insoluble carbohydrate is then further separated by alkali treatment. An alternative process is to treat defatted soy flour in alkali condition to separate the insoluble carbohydrate first and then separate the soy protein from the whey in acidic condition. If the alkali process is used to separate the spent flakes (mostly soy carbohydrate), the composition of spent flake is approximately 12% cellulose, 17% pectin, 14% protein, and 53% insoluble polysaccharide. It is clear that the composition of soy carbohydrate is very different from starch that contains mostly amylose and amylopectin. The defatted soy flour, soy spent flake, and soy protein concentrate used in this invention can be defined as the mixture of soy protein and soy carbohydrate that contains 15-90% soy carbohydrate.

Protein, in general, has been suggested as a component in rubber latex. For example, U.S. Pat. No. 2,056,958 discloses a flexible floor covering composition containing casein (milk protein) and rubber latex. U.S. Pat. No. 2,127,298 shows a composition consisting of protein, starch, and resinous matter for applications such as abrasive wheels and paint formulations. This patent also discloses a composition containing soya bean meal, lime, sodium fluoride, aluminum stearate, an oleo-resin, isopropyl alcohol, and dispersed rubber. However, the patent does not teach the use of soya bean meal in ionic polymers such as carboxylic acid or sulfonic acid modified rubber for modulus reinforcement. U.S. Pat. No. 2,931,845 teaches the composition of rubber-protein-glyoxal for modulus reinforcement. U.S. Pat. No. 3,113,605 teaches using a mixture of protein and carbohydrate in rubber tires to modify frictional properties, such as anti-skid resistance. U.S. Pat. No. 5,446,078 discloses using dry reactive melt blending of protein with polymers containing non-ionic maleic anhydride to form covalent bonds. The patent does not teach the use of a combination of soy protein and soy carbohydrate to achieve synergistic reinforcement effects in a polymer matrix. The reaction of maleic anhydride with active hydrogen functional groups from protein can only occur in the dry state, and the alkali neutralized maleic anhydride groups can not be used because the salt of maleic anhydride is not reactive. The patent also fails to teach the formation of intimate ionic complexes in aqueous phase with neutralized carboxylic acid functional groups, where the interaction between the reinforcing phase and the polymer matrix is an ionic interaction instead of covalent bonding. U.S. Pat. No. 6,632,925 teaches using plant protein and a compatibilizer in polylactide composites. However, polylactide is not an ionic polymer because it does not contain ionic functional groups along the polymer backbone for it to be water dispersible. Therefore, polylactide cannot be used to form a complex with soy products in alkali water solution and is not suitable as a polymer matrix in the present invention. U.S. Pat. Nos. 4,812,550 and 4,607,089 teach the grafting of various reactive monomers onto protein or modified protein with a free-radical initiator. These patents do not teach the formation of non-reactive ionic complex to enhance composite modulus. U.S. Pat. No. 6,291,559 B1 teaches the use of modified or non-modified soy protein and polyacrylate to thicken paper coating dispersions. There is no teaching herein of using a combination of soy protein and soy carbohydrate to achieve synergistic reinforcement effects in a polymer matrix. U.S. Pat. No. 4,185,146 teaches composite formation by reacting diisocyanate with non-ionic polyalkylene ether polyol and solid soybean derivatives in a dry state since the reaction cannot occur in the presence of water. This patent does not show the formation of an ionic complex in water phase. None of these references teach the use of soy spent flakes, defatted soy flour, or soy protein concentrate in the structural reinforcement of ionic polymer materials.

SUMMARY OF THE INVENTION

I have now discovered a novel composition of matter comprising an ionic polymer and a protein and carbohydrate-containing vegetable material component. Of particular interest as the vegetable material component is a soy fraction, such as soy spent flakes, defatted soy flour, or soy protein concentrate. The resultant composites have a significantly higher elastic modulus when compared with base polymer, and also have improved functional properties in comparison with composites of the base polymer and carbon black.

In accordance with this discovery, it is an object of the invention to reinforce ionic polymers with a biodegradable, vegetable-based material.

It is a specific object of the present invention to provide a method for reinforcing ionic polymers by forming a complex of soy spent flake and ionic polymers in aqueous phase, followed by a water removal process.

Further, it is an object of the present invention to provide a method for reinforcing ionic polymers by forming a complex of defatted soy flour and ionic polymers in aqueous phase, followed by a water removal process.

In addition, it is also an object of the present invention to provide a method for reinforcing ionic polymers by forming a complex of soy protein concentrate and ionic polymers in aqueous phase, followed by a water removal process.

One embodiment of the present invention includes reinforcing ionic polymers with soy spent flakes obtained in the alkali separation process of soy protein isolate.

Another embodiment of the present invention includes reinforcing ionic polymers with defatted soy flour obtained in an organic solvent separation process or a solventless process to remove soybean oil from soybean flakes.

An additional embodiment of the present invention includes reinforcing ionic polymers with soy protein concentrate obtained in an acidic separation process of defatted soy flour to remove soluble whey.

The present invention also includes ionic polymers that either are synthesized by a copolymerization process or are modified by a polymer modification process to include ionic functional groups for forming an aqueous dispersion and forming complexes with soy spent flake or defatted soy flour.

BRIEF DESCRIPTION OF THE DRAWING

FIG. 1 is a plot of shear elastic modulus vs. temperature of composites filled with different amount of defatted soy flour (FIG. 1A), soy spent flake (FIG. 1B), soy protein concentrate (FIG. 1C), or carbon black N339 (FIG. 1D). The significant extent of reinforcement is demonstrated when the composite moduli are compared with the modulus of ionic polymer with 0% of fillers.

FIG. 3 is a plot of shear elastic moduli of composites filled with 20% defatted soy flour (FIG. 3A), soy spent flakes (FIG. 3B), soy protein concentrate (FIG. 3C), or carbon black (FIG. 3D). The plot demonstrates the change of moduli with eight cycles of dynamic strain at 1 Hz and 140° C. (rubbery region).

FIG. 4 is a plot of shear elastic moduli of composites filled with 30% of defatted soy flour (FIG. 4A), soy spent flakes (FIG. 4B), soy protein concentrate (FIG. 4C), or carbon black (FIG. 4D). The plot demonstrates the change of elastic moduli with eight cycles of dynamic strain at 1 Hz and 140° C. (rubbery region).

FIG. 5 is a plot of composites filled with different amounts of defatted soy flour (FIG. 5A), soy spent flakes (FIG. 5B), soy protein concentrate (FIG. 5C), or carbon black N339 (FIG. 5D). The plot demonstrates the stress-strain behavior at 50 mm/min and 23° C. (transition zone, $T_g+13°$ C.).

DETAILED DESCRIPTION OF THE INVENTION

Sources of the protein and carbohydrate-containing vegetable material for use herein include fractions or components of vegetable seeds, particularly oil seeds, that have been processed to remove substantially all of the oil. Typical oil processing procedures include pressing and/or extraction with aqueous or organic solvents, or with supercritical fluids. The residues resulting from oil recovery steps of vegetable seeds may include press cakes, meals, flakes, flours, protein concentrates and the like. The residues for use herein will contain at least 10% protein, preferably at least 20% protein, and less than 85% protein, preferably less than 70% protein, and 15-90% carbohydrate, preferably 30-80%, all on a dry weight basis. Examples of suitable oilseeds include soybean, cottonseed, linseed, safflower, sunflower, lupine, sesame, tung, canola (rapeseed) and peanut. Of particular interest are soybeans, and especially the soy spent flake, defatted soy flour, and soy protein concentrate.

Soy spent flakes are the residue remaining after oil, protein, and whey extraction of flaked soybeans. When the oil is solvent-extracted, the flakes are also treated to remove residual solvent. Protein content of soy spent flakes is typically about 15%, on a dry weight basis.

Defatted soy flour is the ground, screened, graded product obtained after extracting most of the oil from sound, clean, dehulled soybeans. Soy flour is produced from finely grinding the defatted soy flakes so that most of it passes through a number 100 screen. Grits are similarly produced, but constitute a coarser fraction than the flour. Protein contents of defatted soy flakes and grits ranges from about 40-60%, dry weight basis.

Soy protein concentrate is prepared from high quality sound, clean, dehulled soybean seeds by removing most of the oil and water-soluble, non-protein constituents. Soy protein concentrate contains at least 65% protein, dry weight basis.

The preferred class of ionic polymers to be reinforced by the aforementioned vegetable material are polymers with a glass transition temperature below 150° C.

Ionic polymers intended for use herein include both synthetic and natural polymers containing a sufficient number of ionic functional groups capable of dispersing the polymer in water to form an aqueous emulsion. Examples of suitable ionic polymers are carboxylated poly(styrene-butadiene), poly(ethylene-acrylic acid), poly(butadiene-acrylic acid), sulfonated ethylene-propylene-diene terpolymer, poly(ethylene-methacrylic acid) . . . etc. Other examples are carboxylic acid-modified urethane rubber, carboxylic acid-modified polybutadiene, carboxylic acid-modified polyisoprene, carboxylic acid-modified nitrile butadiene rubber, carboxylic acid-modified butyl rubber, carboxylic acid-modified fluorine-based thermoplastic elastomer, carboxylic acid-modified silicone rubber, carboxylic acid-modified polyester-based thermoplastic elastomer, carboxylic acid-modified polyamide-based thermoplastic elastomer, carboxylic acid-modified fluororubber, carboxylic acid-modified epichlorohydrin rubber, carboxylic acid-modified vinyl chloride-based thermoplastic elastomer, carboxylic acid-modified norbornene rubber, carboxylic acid-modified styrene-based thermoplastic elastomer, carboxylic acid-modified olefin-based thermoplastic elastomer, carboxylic acid-modified urethane-based thermoplastic elastomer, and carboxylic acid-modified polysulfide rubber.

Anionic polymers made by the copolymerization of monomers containing carboxylic acid or sulfonic acid groups are suitable to form complexes with soy spent flake, defatted soy flour, or soy protein concentrate. Examples of carboxylic acid-containing monomers are methacrylic acid, acrylic acid, fumaric acid, maleic acid, tartaric acid, itaconic acid, and crotonic acid. An examples of sulfonic acid-containing monomers is ethylene sulfonic acid.

Anionic polymers made by chemical modification of existing polymers are also suitable for this application. Examples of this class of ionic polymers are the reaction products of alkali hydrolysis of esters of the aforementioned carboxylic acid-containing monomers. Another class of ionic polymers results from the direct sulfonation of aromatic and/or unsaturated polymers. Other carboxylic acid-modified polymers are carboxylic acid-modified liquid isoprene rubber latex, carboxylic acid-modified isoprene rubber latex, carboxylic acid-modified styrene-butadiene rubber latex, carboxylic acid-modified natural rubber latex, carboxylic acid-modified butadiene rubber latex, carboxylic acid-modified acrylonitrile-butadiene rubber latex, carboxylic acid-modified chloroprene latex, carboxylic acid-modified acryl rubber latex, carboxylic acid-modified acrylate-butadiene rubber latex, carboxylic acid-modified vinyl acetate rubber latex.

Copolymerizable ethylenically unsaturated monomers useful in producing the carboxylic acid functional copolymer are monomers containing carbon-to-carbon, ethylenic unsaturation, including vinyl monomers, acrylic monomers, allylic monomers, acrylamide monomers, and mono- and dicarboxylic unsaturated acids. Exemplary monomers are described, below. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates.

Carboxylic acid functional polymers contemplated herein comprise copolymerized monomers including carboxylic acid monomers that may include methacrylic acids, acrylic acid, and olefinic unsaturated acids. Acrylic acids include acrylic and methacrylic acid, ethacrylic acid, alpha-chloracrylic acids, alpha-cyanoacrylic acid, crotonic acid, and beta-acryloxy propionic acid. Olefinic unsaturated acids include fumaric acid, maleic acid or anhydride, itaconic acid, citraconic acid, mesaconic acid, muconic acid, glutaconic acid, aconitic acid, hydrosorbic acid, sorbic acid, alpha-chlorosorbic acid, cinnamic acid, and hydromuconic acid. On a weight basis, the carboxylic acid functional polymer contains at least 1% copolymerized carboxyl functional monomers and preferably between 5% and 15% carboxylic acid monomers, with the balance being other ethylenically unsaturated monomers. Carboxylic acid functional polymers preferably are produced in bulk, either in solvent or by emulsion/suspension polymerization.

One class of carboxyl functional polymer comprises a polyester polymer. Polyester polymers comprise the esterification products of glycols, diols, or polyols with excess equivalents of dicarboxylic acid or polycarboxylic acids. Linear aliphatic glycols are esterified with greater molar amounts of aromatic dicarboxylic acid and/or linear saturated dicarboxylic acid having between 2 and 10 linear carbon atoms such as adipic, azelaic, succinic, glutaric, pimelic, suberic or sebacic acid to produce polyesters. Additionally, larger dicarboxylic acids, such as the dimer fatty acids, dodecanedioic acid and the like can be used. Preferred and commercially available linear saturated dicarboxylic acids are adipic, azelaic, dodecane-dicarboxylic acid and the dimer fatty acids. Aromatic dicarboxylic acids (anhydrides) include phthalic, isophthalic, terephthalic, and tetrahydrophthalic. Minor amounts of polyfunctional acid such as trimelletic acid can be added. Suitable glycols include linear aliphatic glycols having 2 to 8 carbon atoms, such as 1,3- or 1,4-butylene glycol, 1,6-hexane diol, neopentyl glycol, propylene glycol, ethylene glycol and diethylene glycol, propylene, and dipropylene glycol, and similar linear glycols. Additionally, the larger diols such as hydrogenated bisphenol A, and the $C_{10}$ to $C_{18}$ diols are suitable. Preferred glycols are hydrophobic glycols such as neopentyl glycol and 1,6-hexane diol and hydrogenated bisphenol A. Minor amounts of polyols can be used such as glycerol, pentaerythritol, dipentaerythritol, or trimethylol ethane or propane. The molar deficiency of the glycol over the greater molar amounts of aromatic and linear saturated dicarboxylic acid is between about 1 and 50 and preferably between about 5% and 20%. Hence, the polyester contains a considerable excess of unreacted carboxylic groups to provide a carboxyl polyester having an Acid No. between 5 and 300 and preferably between 20 and 100. Glycol can be esterified with minor amounts of up to about 20% by weight of unsaturated dicarboxylic acids (anhydrides) including maleic, fumaric or itaconic acids; or monocarboxylic acids such as acetic, benzoic, and higher chain aliphatic and aromatic acids up to about 12 carbon atoms. The polyester component can be produced by solvent or bulk polymerization although bulk polymerization is preferred. The raw materials can be charged in bulk and esterification polymerized at temperatures typically between 170° C. to 240° C., although moderately higher or lower temperatures can be utilized satisfactorily with appropriate adjustment in the reaction time as within the skill of a person in the art. An esterification catalyst can be used, typically at less than 1% levels based on charge, such as an organic tin compound or organic titanate.

Another class of carboxyl polymer contemplated for use in this invention is a carboxyl functional polymer comprising acrylic grafted polyester. Grafted copolymers of polyester and acrylics can be produced by free-radical polymerization of ethylenically unsaturated monomers, including acrylic and carboxyl monomers, in the presence of a preformed molten or fluid polyester at temperatures sufficient to induce addition copolymerization of the monomers along with some grafting onto the polyester backbone. The acrylic polymer component of the acrylic grafted polyester comprises in-situ copolymerized ethylenically unsaturated monomers, including acrylic monomers and carboxyl monomers, along with other ethylenically unsaturated monomers if desired. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates. Acrylic acids include acrylic and methacrylic acid, ethacrylic acid, alpha-chloroacrylic acid, alpha-cyanoacrylic acid, crotonic acid, beta-acryloxy propionic acid, and beta-styryl acrylic acid. Other ethylenically unsaturated monomers have been previously described herein. The copolymerized monomers for the acrylic component of the acrylic grafted polyester comprises copolymerized monomers, on a weight basis between 1% and 100% acrylic monomer, between 0% and 30% carboxylic acid containing monomer, with the balance being other ethylenically unsaturated monomers. Preferred acrylic components comprise on a weight basis between 20% and 90% acrylic monomer, between 5% and 15% carboxyl acid monomer, with the balance being other ethylenically unsaturated monomers. It should be noted that the carboxyl functionality could be part of the polyester polymer or part of the grafted acrylic polymer or both polymers. The acrylic grafted polyester preferably comprises by weight between 10% and 70% polyester polymer component and between 30% and 90% acrylic polymer component.

Another class of carboxyl polymers for use herein is carboxyl functional urethanes that can be produced by co-reacting diisocyanates with a diol or a polyol and a hydroxyl acid. Linear polyurethanes are obtained from difunctional reactants while branched polyurethanes are produced from the combination of difunctional and higher functional reactants. Urethanes for ionomeric crosslinking in composites can be prepared from any of several available aromatic, aliphatic, and cycloaliphatic diisocyanates and polyisocyanates. Suitable polyisocyanates can be di- or triisocyanates such as, for example, 2,4- and 2,6-tolylene diisocyanates, phenylene diisocyanate; hexamethylene or tetramethylene diisocyanates, 1,5-naphthalene diisocyanate, ethylene or propylene diisocyanates, trimethylene or triphenyl or triphenylsulfone triisocyanate, and similar di- or triisocyanates or mixtures thereof. The polyisocyanate can be generally selected from the group of aliphatic, cyclo-aliphatic and aromatic polyisocyanates such as for example hexamethylene 1,6-diisocyanate, isophorone diisocyanate, diphenylmethane diisocyanate 2,4-tolylene diisocyanate, 2,6-tolylene diisocyanate and mixtures thereof, polymethylene polyphenyl polyisocyanate, or isocyanate functional prepolymers. Preferred diisocyanates include isophorone diisocyanate, hexamethylene diisocyanate, toluene diisocyanate and the like.

A wide variety of diols and polyols can be used to prepare urethanes with a wide range of properties. Polyethers, such as the polytetramethylene oxides can be used to impart flexibility as well as the polyethylene oxides and polypropylene oxides. Simple diols that can be used include neopentyl glycol, 1,6 hexane diol, and longer chain diols having 12-, 14- and higher carbon chains. Branching can be introduced with polyols such as trimethylol propane and pentaerythritol. Hydroxyl functional polyesters and various other hydroxyl functional polymers are also suitable. Useful polyols preferably contain two, three, or four hydroxyl groups for co-reaction with the free isocyanate groups. Useful polyols are: diols such as ethylene glycol, propylene glycols, butylene glycols, neopentyl glycol, 14-cyclohexane dimethanol, hydrogenated bisphenol A, and the like; triols such as glycerol, trimethylol propane, trimethylol ethane; tetrols such as pentaerythritol; hexols such as sorbitol, dipentaerythritol, and the like; polyether polyols produced by the addition of alkylene oxides to polyols; polycaprolactone polyols produced by the addition of monomeric lactones to polyols, such as caprolactone; and hydroxyl terminated polyesters.

The polyurethane copolymers suitable for use herein further contain a co-reacted hydroxy-acid material. The hydroxy-acid contains at least one reactive hydroxy group for co-reacting with the isocyanate during polymer synthesis and at least one non-reactive carboxy group which is essentially non-reactive to the isocyanate groups during the polymer synthesis. Examples of alkyl acids are 2,2 dihydroxymethyl propionic acid, 2,2-dihydroxymethyl butyric acid, glycolic acid, and the like; other acids are lactic acid, 12-hydroxy stearic acid, the product of the Diels-Alder addition of sorbic acid to di-(2-hydroxyethyl)maleate or fumarate, or low molecular weight (300 to 600) precondensates of polyols with tribasic acids such as trimelletic anhydride or ricinoleic acid. Acid functionality can be introduced with materials like 12-hydroxystearate, dimethylolpropionic acid, and various other hydroxy acids. Monohydroxyl acids will position the acid functionality at the end of the chain, while the diol acids will randomly place the acid groups at intermediate positions within the chain. When isocyanates are reacted with diols and polyols of various types, the reaction rate may be enhanced by the use of catalysts. Common isocyanate catalysts are suitable, and examples include dibutyltindilaurate, dibutyltinoxide, and the like.

A different class of ionic polymer that is also suitable for use in the current invention is the sulfonic acid-containing polymers. These polymers can be made by copolymerizing a sulfonic acid-containing monomers. Typical examples of sulfonate-containing monomers suitable in the practice of the present invention include alkali metal salts of styrene sulfonic acid, vinyl sulfonate, and acryloamidopropane sulfonic acid. Sulfonic acid groups can also be introduced by the direct sulfonation of aromatic and/or unsaturated polymers. For example, the sulfonation can be made using acetyl sulfate or a combination of acetic anhydride and sulfuric acid at ambient or elevated temperatures. After the sulfonation, the reaction can be terminated by alcohol or water.

Still another class of ionic polymer is the non-covalent complex of hydrophobic polymer with surfactants that contain carboxylic acid or sulfonic acid functional groups. The hydrophobic polymers suitable for this class of complex are the aforementioned ionic polymers without the incorporation of ionic monomers or ionic functional groups. Examples of surfactants suitable for the formation of the complex are fatty acids and their salts such as lauric acid, mystric acid, palmitic acid, stearic acid, oleic acid, linoleic acid, linolenic acid, or a mixture thereof. The examples of sulfonic acid containing surfactants are linear alkylbenzene sulfonic acid, fatty alcohol sulfate, fatty alcohol ether sulfate, or their mixtures.

The level of addition of the vegetable material may be greater than 2.5%, 5%, 10%, 15%, 20%, 30%, 40%, or 50% of the total amount of vegetable material and ionic polymer on a dry weight basis. Typically, the level of addition will be in the range of about 10-30% by weight of the total of these two components.

For the polymer material reinforcement, it is necessary for the reinforcing material to be more rigid than the polymer to be reinforced. The soy products described herein, including soy spent flake, defatted soy flour, and soy protein concentrate yield composites having high elastic modulus and improved stress-strain behavior, and therefore are suitable for such applications. Relative to composites that are reinforced with carbon black or with vegetable material comprised of at least 90% (dry weight basis) of protein, the composites of this invention are characterized by a higher elastic modulus.

As previously mentioned, soy spent flakes obtained from the alkali separation process are suitable for use in the current invention. The alkali separation process involves the dispersion of defatted soy flour in water at alkali pH that is adjusted using strong base, such as sodium hydroxide or potassium hydroxide. After heat treatment at 40-60° C. to disperse the soy protein, the spent flakes can be separated by centrifugation. The dispersed soy protein remains in the aqueous phase, while spent flakes precipitate under the centrifugal force.

Defatted soy flour obtained from either an organic solvent separation process or from a solventless process is suitable for use in the current invention. For example, defatted soy flour obtained from hexane extraction process of de-hulled and flaked soybean to remove soybean oil, as described previously, may be used. Soy protein concentrate obtained from the acidic separation process of defatted soy flour by removing the water-soluble whey is also suitable for use herein.

In making the composites of the invention, the vegetable matter is first dispersed in water under alkaline conditions so as to solubilize the protein. The pH conditions of the dispersion should be adjusted to at least about pH 7.5, and more typically pH 9.0 or greater. Thereafter, the ionic polymer is thoroughly blended into the dispersion at ambient temperature. The mixing time is usually less than 30 minutes due to the low viscosity of the mixture. The dispersion is then dewatered and the complex solidified by any appropriate means as known in the art. For instance, the dispersion can be casting into a film, bar, or the like, during which process the water is expelled from the composite during setting of the cast. In another embodiment of the invention, the dispersion can be acidulated so as to coagulate the composite material. The acid-coagulated co-precipitate is then separated from the aqueous medium by centrifugation, screening, or the like. The coagulated material may further be dewatered by banding on a rubber mill or aromatic fluid bed dryer at elevated temperatures.

Other components may be added to the resultant composite material prior to or after solidification, depending on the prospective end-use application. These components include, but are not limited to, biocide, colorant, surfactant, other filler, anti-foam agent, cross-linking agent, UV-protectants, plasticizer, oil, antioxidant, softening agent, cross-linking or vulcanization accelerator, and the like. It is also understood that proportions, components, and the manner and order of adding the components may be varied over a wide range depending on a number of factors such as the end-use application for the resulting formulation.

Biocides are important for stability of the aqueous dispersion of vegetable matter and/or ionic polymer if the dispersion is to be held for a substantial period of time prior to processing. Biocides may also be important because of residual moisture that may be initially present after solidification of the complex, and also due to the potential for hydroscopic absorption of moisture during storage and use of the bulk material or end product. The biocide can be present in any effective amount to improve the stability of aqueous dispersion or product, typically, an amount exceeding about 0.1% by weight, and usually in the range of 0.1% to about 1% on a dry weight basis of the solid complex. The biocide is preferably added during the mixing process of vegetable material with the aqueous dispersion of ionic polymers. Generally, anionic and non-ionic types of biocide are preferred.

Examples of anionic biocides include: anionic potassium N-hydroxymethyl-N-methyl-dithiocarbamate; an anionic blend of N-hydroxymethyl-N-methyl dithiocarbamate (80 percent by weight) and sodium 2-mercapto benzothiazole (20 percent by weight); an anionic blend of sodium dimethyl dithiocarbamate, 50 percent by weight, and (disodium ethylenebis-dithiocarbamate), 50 percent by weight; an anionic blend of Nomethyldithiocarbamate, 60 percent by weight, and disodium cyanodithioimidocarbonate, 40 percent by weight; an anionic blend of methylene bis-thiocyanate (33 percent by weight), sodium dimethyl-dithiocarbamate (33 percent by weight), and sodium ethylene bisdithiocarbamate (33 percent by weight); sodium dichlorophene (G-4-40 available from Givaudan Corporation); and the like, as well as mixtures thereof.

Examples of nonionic biocides include: 2-hydroxypropylmethane thiosulfonate; 2-(thio cyanomethyl thio)benzothiazole; methylene bis(thiocyanate); 2-bromo-4'-hydroxyacetophenone; 1,2-dibromo-2,4-dicyano-butane; 2,2-dibromo-3-nitropropionamide; N-α-(1-nitroethyl benzylethylene diamine); dichlorophene (6-4 available from Givaudan Corporation); 3,5-dimethyl tetrahydro-2H-,1,3,5-thiadiazine-2-thione; a nonionic blend of a sulfone, such as bis(trichloromethyl)sulfone and methylene bisthiocyanate; a nonionic blend of methylene bisthiocyanate and bromonitrostyrene; a nonionic blend of 2-(thiocyanomethylthio)benzothiazole (53.2 percent by weight) and 2-hydroxypropyl methanethiosulfonate (46.8 percent by weight); a nonionic blend of methylene bis(thiocyanate) 50 percent by weight and 2-(thiocyanomethylthio)benzothiazole, 50 percent by weight; a nonionic blend of 2-bromo-4'-hydroxyacetophenone (70 percent by weight) and 2-(thiocyanomethylthio)benzothiazole (30 percent by weight); a nonionic blend of 5-chloro-2-methyl-4-isothiazoline-3-one (75 percent by weight) and 2-methyl-4-isothiazolin-3-one (25 percent by weight), and the like, as well as mixtures thereof.

Examples of cationic biocides include: cationic poly(oxyethylene(dimethylamino)-ethylene (dimethylamino)ethylene dichloride); a cationic blend of methylene bisthiocyanate and dodecyl guanidine hydrochloride; a cationic blend of a sulfone, such as bis(trichloromethyl)sulfone and a quaternary ammonium chloride; a cationic blend of methylene bis thiocyanate and chlorinated phenols, and the like, as well as mixtures thereof.

Crosslinking agents that are frequently used in rubbers are elemental sulfur and disulfides such as alkylphenol disulfides, N,N'-caprolactam disulfides, 4,4'-dithiobismorpholine, dipentamethylene thiuram disulfide, dipentamethylene thiuram hexasulfide, dipentamethylene thiuram tetrasulfide, dipentamethylene thiuram monosulfide, tetrabutyl thiuram disulfide, tetraethyl thiuram disulfide, tetramethyl thiuram disulfide, tetramethyl thiuram monosulfide, and the like. Various peroxide compounds are also used, such as dicumyl peroxide, t-butylperoxy-diisobutyl benzene, di(2,4-dichloro benzoyl)peroxide, dibenzoyl peroxide, t-butylperoxy benzoate, 1,1-di(t-butylperoxy)-3,3,5-trimethyl-cyclohexane, 2,5-dimethyl-2,5-di(t-butylperoxy)hexane, 2,5-dimethyl-2, 5-di(t-butylperoxy)hexyne-3, and the like.

The following examples are provided to illustrate preferred embodiments of the invention and are not intended to restrict the scope thereof. Unless otherwise indicated, all percentages are expressed as weight percentages.

All references disclosed herein or relied upon in whole or in part in the description of the invention are incorporated by reference.

EXAMPLE 1

Preparation of 10% Soy Spent Flakes Composite.

Figure 1A:
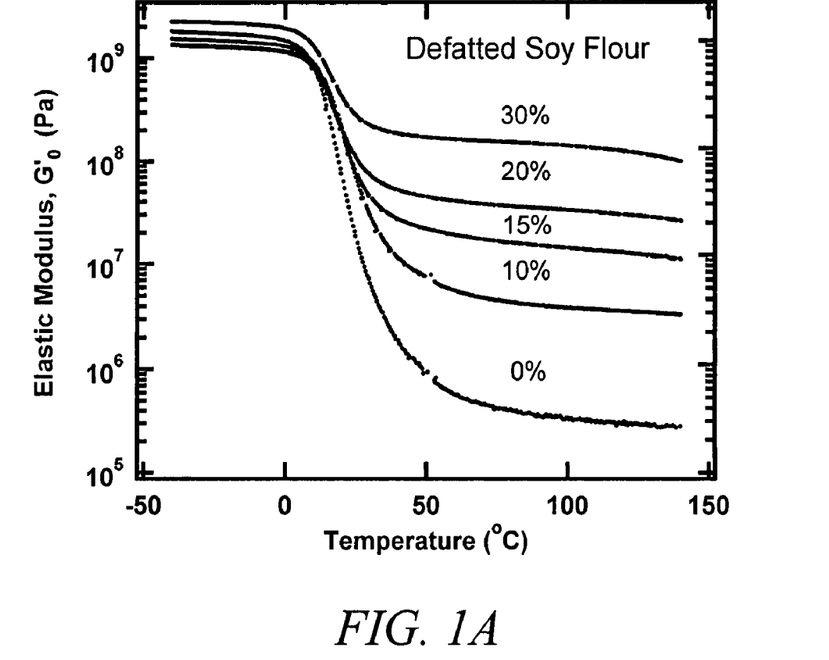
Figure 1B:
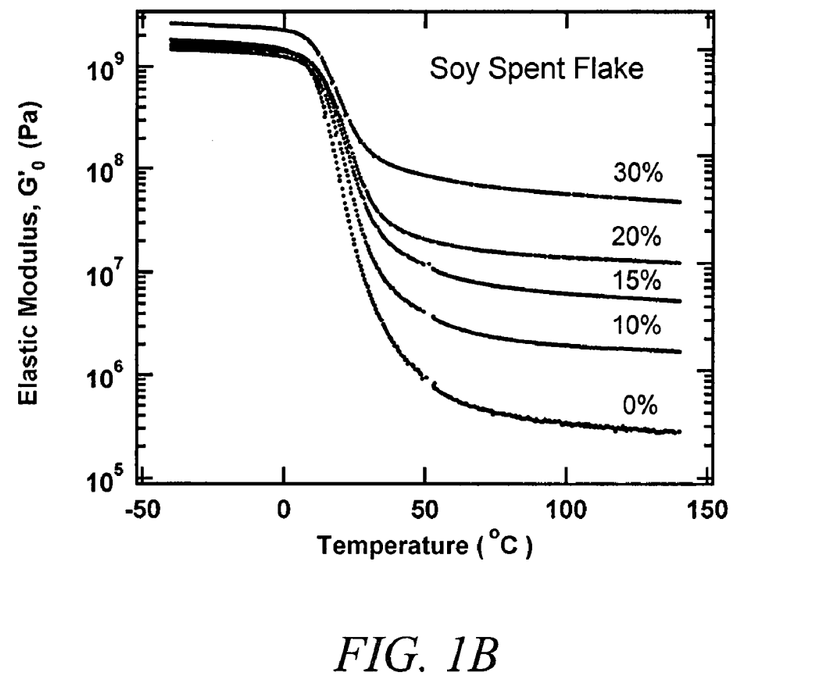
Figure 1C:
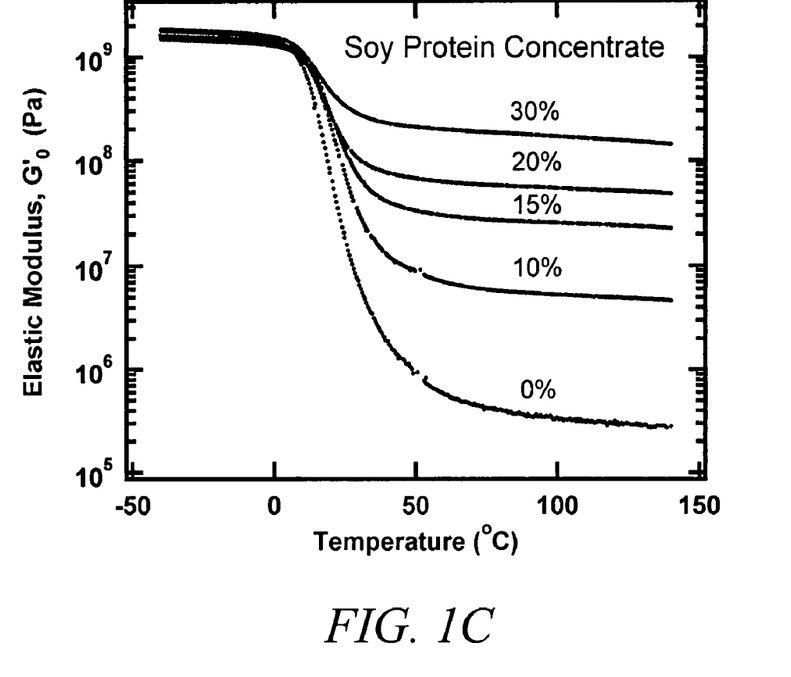
Figure 2:
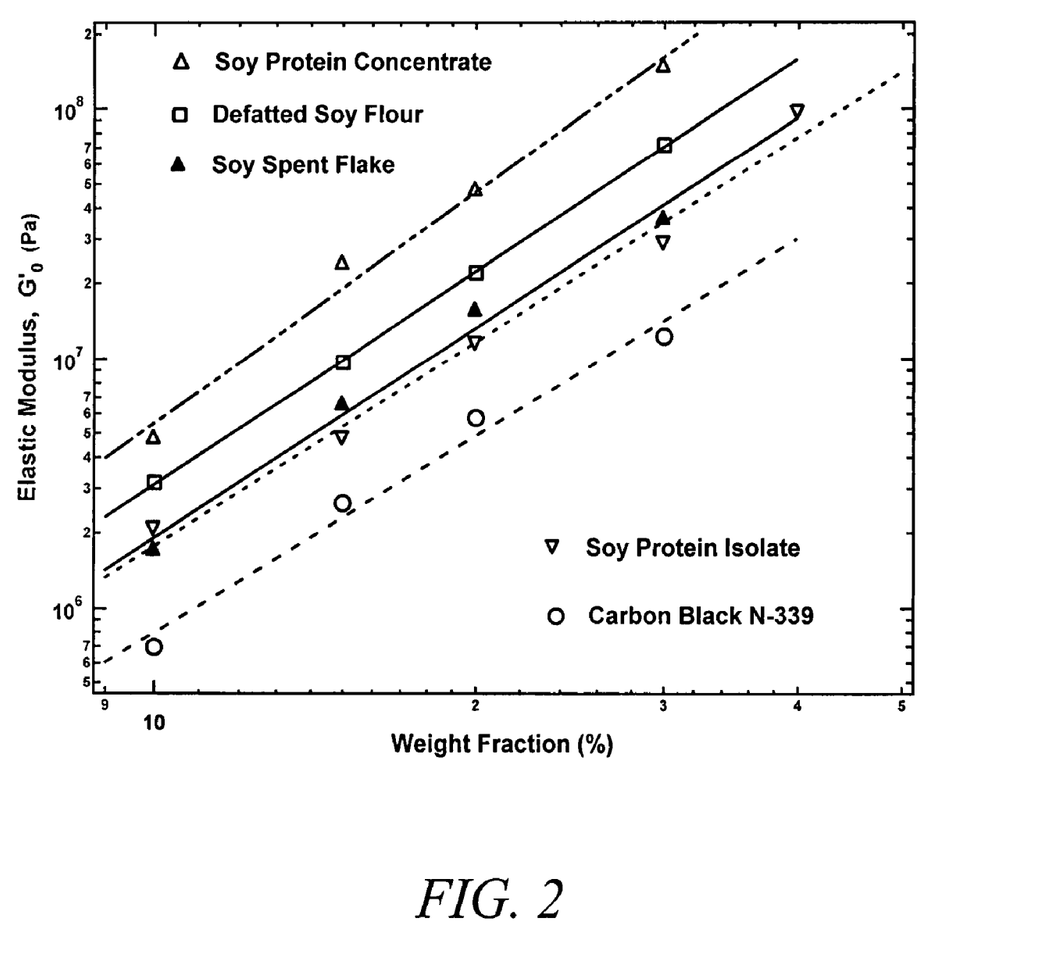
FIG. 2 is a plot of shear elastic modulus of composites filled with different amounts of soy spent flakes, defatted soy flour, soy protein concentrate, soy protein isolate, or carbon black. The plot demonstrates a significant extent of reinforcement in the rubbery region occurring in composites reinforced with soy spent flakes, defatted soy flour, or soy protein concentrate when compared with the comparative examples of soy protein isolate- or carbon black-reinforced composites.
Figure 3A:
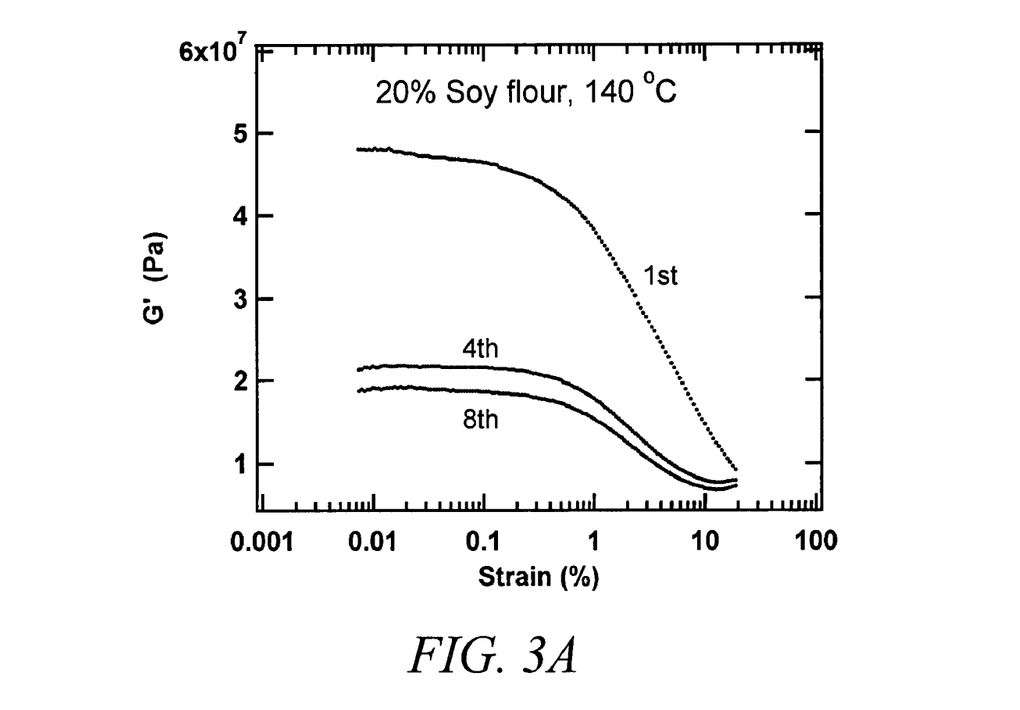
Figure 3B:
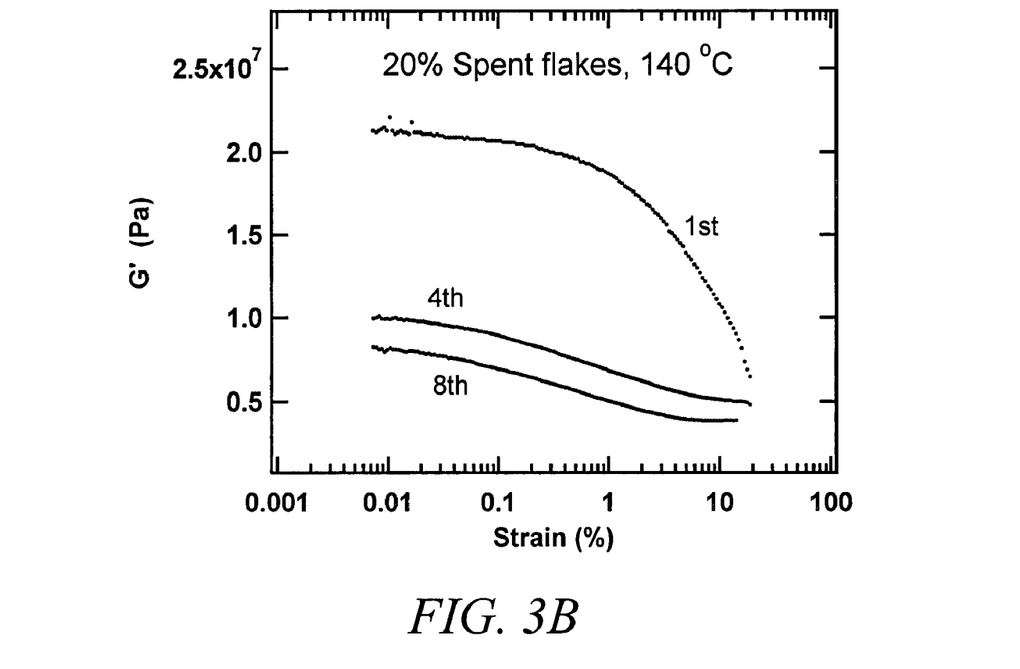
Figure 3C:
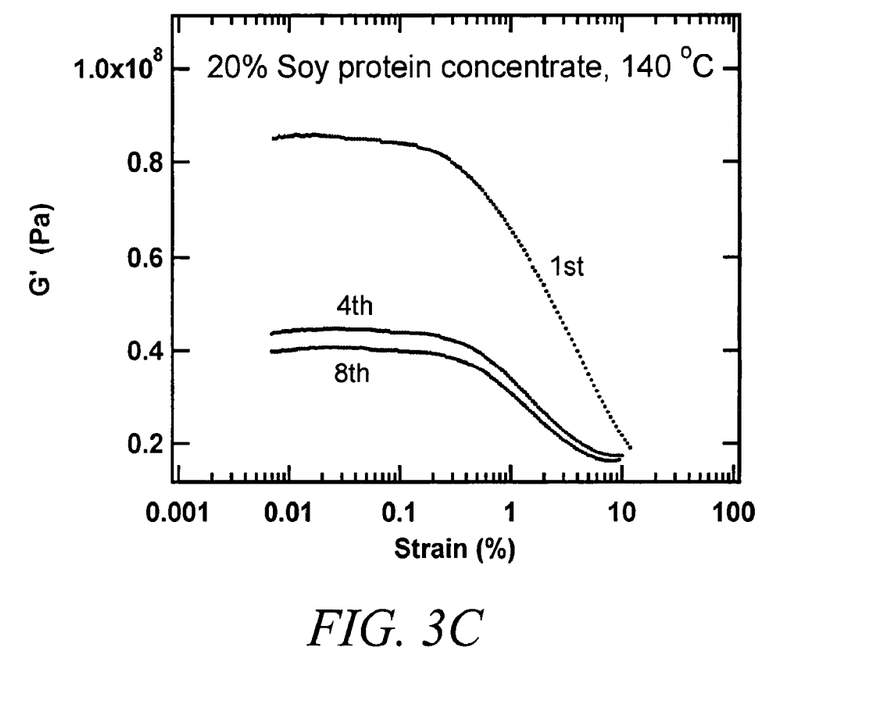
Figure 3D:
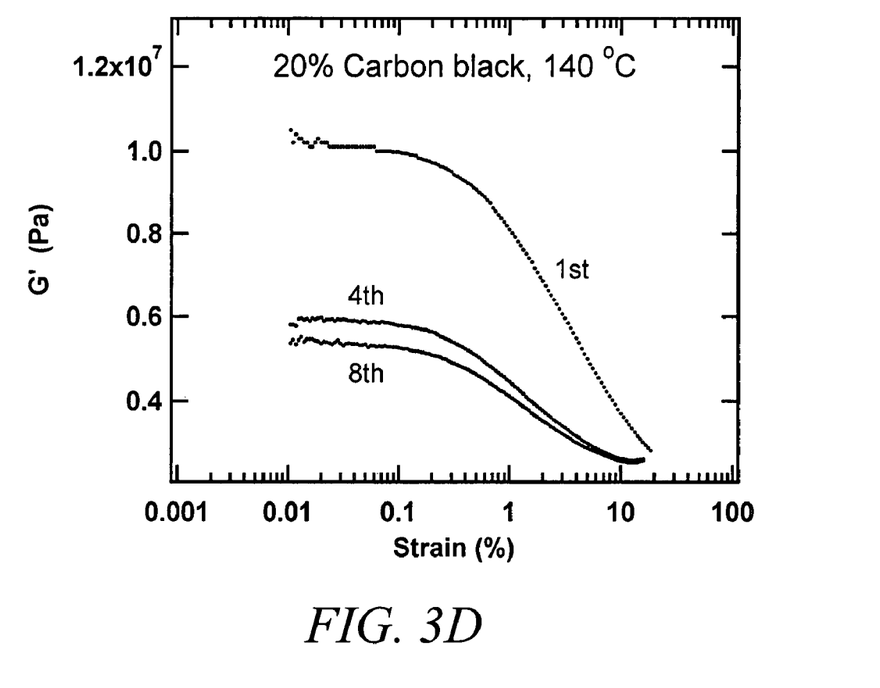
Figure 5A:
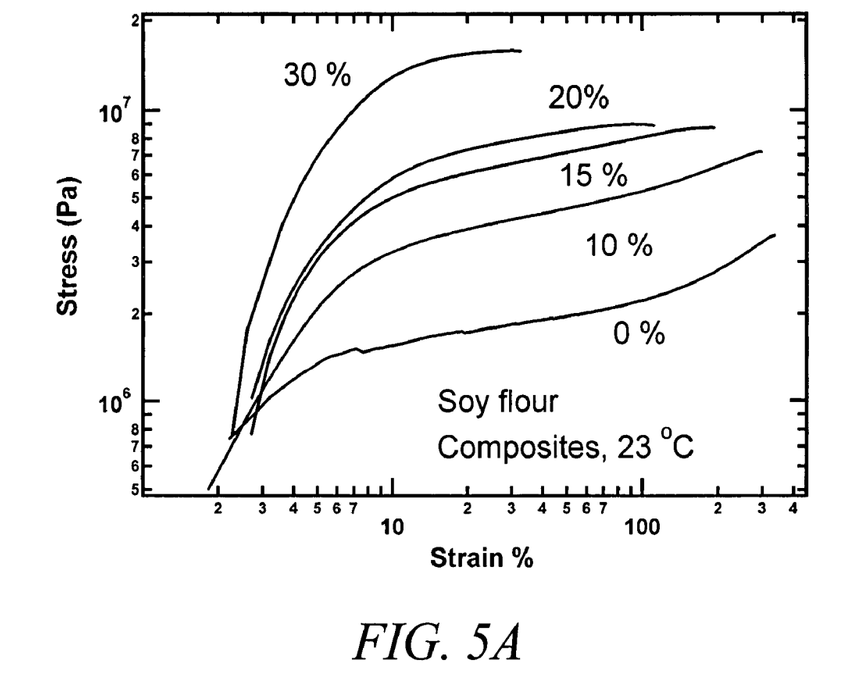
Figure 5B:
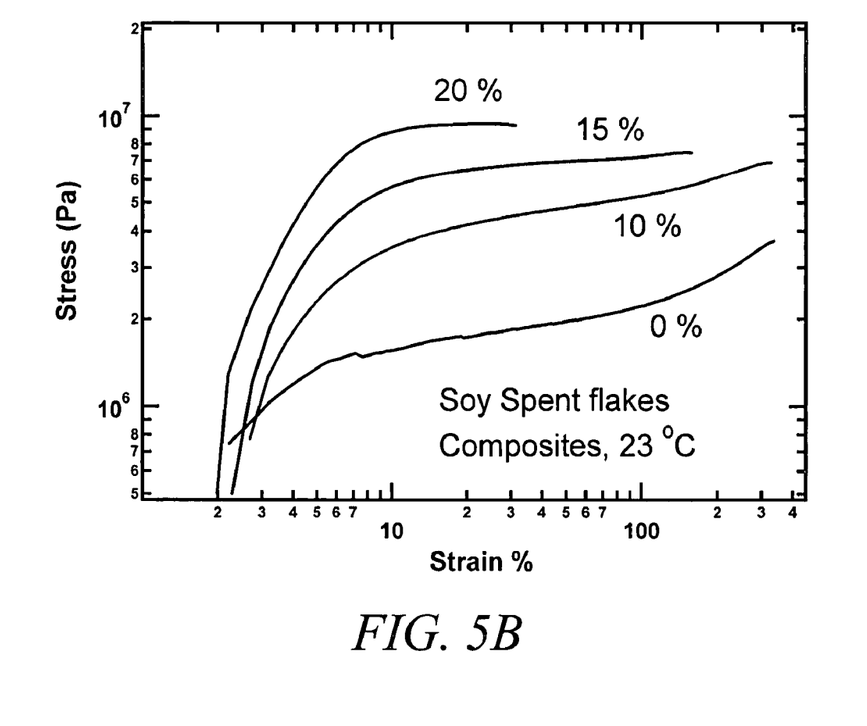
Figure 5C:
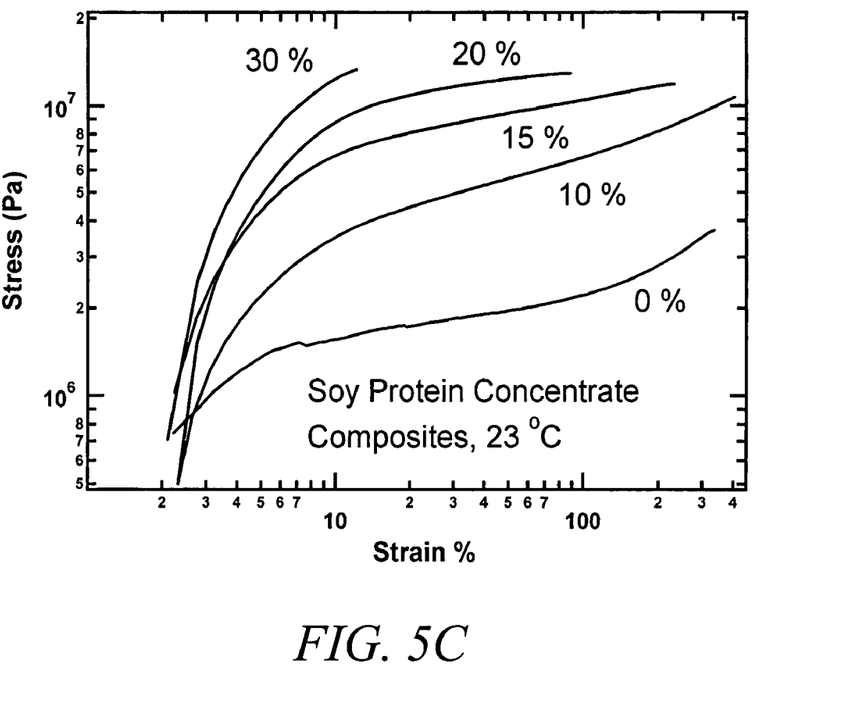

Soy spent flakes were obtained by dispersing 154 gm of defatted soy flour (Nutrisoy 7B, ADM) in 810 gm of water and cooking at pH 10 and 45° C. for 1 hour. The resulting dispersion was then centrifuged at 3000 rpm and 15° C. for 10 minutes. Soy protein dispersion was removed and the spent flakes were washed with water and centrifuged again to obtain spent flakes with a solids content of 12.2%. A 131.1 gm sample of a 7.6% aqueous dispersion of spent flakes was mixed with 177.3 gm of 50.7% carboxylated styrene-butadiene latex (CP620NA, Dow), and the pH was adjusted to 9. The dispersion was first dried at 75° C. to a moisture content of 3-4% and then dried at 140° C. to a moisture content of less than 1%. After drying, the shear elastic moduli from −40° C. to 140° C. were measured by a dynamic mechanical method at 1 rad/s and 0.05% strain (Rheometric ARES). The effect of dynamic strain is measured at 1 Hz. The stress-strain properties are measured by INSTRON at 50 mm/min and 23° C. The mechanical properties of this composite are shown in FIG. 1B, FIG. 2, and FIG. 5B.

EXAMPLE 2

Preparation of 15% Soy Spent Flakes Composite.

Soy spent flakes were obtained by dispersing 250 gm of defatted soy flour (Nutrisoy 7B, ADM) in 1300 gm of water and cooking at pH 10 and 45° C. for 1 hour. The resulting dispersion was then centrifuged at 3000 rpm and 15° C. for 10 minutes. Soy protein dispersion was removed and the spent flakes were washed with water and centrifuged again to obtain spent flakes with a solids content of 9.4%. A 209.7 gm sample of a 7.2% aqueous dispersion of spent flakes was mixed with 167.5 gm of 50.7% carboxylated styrene-butadiene latex (CP620NA, Dow) and the pH adjusted to 9. The dispersion was dried in the same manner as that in Example 1. After drying, the mechanical properties were measured as described in Example 1. The mechanical properties of this composite are shown in FIG. 1B, FIG. 2, and FIG. 5B.

EXAMPLE 3

Preparation of 20% Soy Spent Flakes Composite.

Soy spent flakes were obtained by dispersing 154 gm of defatted soy flour (Nutrisoy® 7B, ADM) in 810 gm of water and cooked at pH 10 and 45° C. for 1 hour. The resulting dispersion was then centrifuged at 3000 rpm and 15° C. for 10 minutes. Soy protein dispersion was removed and the spent flakes were washed with water and centrifuged again to obtain spent flakes with a solids content of 12.2%. A 382.5 gm sample of a 5.2% aqueous dispersion of spent flakes was mixed with 157.51 gm of 50.7% carboxylated styrene-butadiene latex (CP620NA, Dow) and the pH adjusted to 9. The dispersion was dried in the same manner as that in Example 1. After drying, the mechanical properties were measured as described in Example 1. The mechanical properties of this composite are shown in FIG. 1B, FIG. 2, FIG. 3B, and FIG. 5B.

EXAMPLE 4

Preparation of 30% Soy Spent Flakes Composite.

Soy spent flakes were obtained by dispersing 250 gm of defatted soy flour (Nutrisoy® 7B, ADM) in 1300 gm of water and cooked at pH 10 and 45° C. for 1 hour. The resulting dispersion was then centrifuged at 3000 rpm and 15° C. for 10 minutes. Soy protein dispersion was removed and the spent flakes were washed with water and centrifuged again to obtain spent flakes with a solids content of 9.4%. A 327.4 gm sample of a 7.3% aqueous dispersion of spent flakes was mixed with 111.5 gm of 50.7% carboxylated styrene-butadiene latex (CP620NA, Dow) and the pH adjusted to 9. The dispersion was dried in the same manner as that in Example 1. After drying, the mechanical properties are measured as described in Example 1. The mechanical properties of this composite are shown in FIG. 1B, FIG. 2, FIG. 4B, and FIG. 5B.

EXAMPLE 5

Preparation of 10% Defatted Soy Flour Composite.

A 10.4-gm sample of 96% defatted soy flour (Nutrisoy® 7B, ADM) was dispersed in 220 gm of water and cooked at pH 9 and 55° C. for 1 hour. 177.5 gm of 50.7% carboxylated styrene-butadiene latex (CP620NA, Dow) was added and the pH adjusted to 9. The dispersion was dried in the same manner as that in Example 1. After drying, the mechanical properties were measured as described in Example 1. The mechanical properties of this composite are shown in FIG. 1A, FIG. 2, and FIG. 5A.

EXAMPLE 6

Preparation of 15% Defatted Soy Flour Composite.

A 15.8-gm sample of 96% defatted soy flour (Nutrisoy® 7B, ADM) was dispersed in 250 gm of water and cooked at pH 9 and 55° C. for 1 hour. 168 gm of 50.7% carboxylated styrene-butadiene latex (CP620NA, Dow) was added and pH adjusted to 9. The dispersion was dried in the same manner as that in Example 1. After drying, the mechanical properties were measured as described in Example 1. The mechanical properties of this composite are shown in FIG. 1A, FIG. 2, and FIG. 5A.

EXAMPLE 7

Preparation of 20% Defatted Soy Flour Composite.

A 20.9-gm sample of 96% defatted soy flour (Nutrisoy® 7B, ADM) was dispersed in 230 gm of water and cooked at pH 9 and 55° C. for 1 hour. 158 gm of 37.9% carboxylated styrene-butadiene latex (CP620NA, Dow) was added and the pH adjusted to 9. The dispersion was dried in the same manner as that in Example 1. After drying, the mechanical properties were measured as described in Example 1. The mechanical properties of this composite are shown in FIG. 1A, FIG. 2, FIG. 3A, and FIG. 5A.

EXAMPLE 8

Preparation of 30Defatted Soy Flour Composite.

A 31.5-gm sample of 96% defatted soy flour (Nutrisoy® 7B, ADM) was dispersed in 230 gm of water and cooked at pH 9 and 55° C. for 1 hour. 140 gm of 50.7% carboxylated styrene-butadiene latex (CP620NA, Dow) was added and pH adjusted to 9. The dispersion dried in the same manner as that in Example 1. After drying, the mechanical properties were measured as described in Example 1. The mechanical properties of this composite are shown in FIG. 1A, FIG. 2, FIG. 4A and FIG. 5A.

EXAMPLE 9

Preparation of 30% Defatted Soy Protein Concentrate Composite.

A 150.3-gm sample of 96% defatted soy flour (Nutrisoy® 7B, ADM) was dispersed in 1200 gm of water and mixed at pH 4.5 for 0.5 hour. The dispersion was centrifuged at 3000 rpm for 10 minutes. The washing process was repeated three times to obtain a soy protein concentrate with 21.9% solids content. 490 gm of water was added to 137 gm of 21.9% soy protein concentrate and cooked at pH 9 and 55° C. for 1 hour. 138.6 gm of 50.7% carboxylated styrene-butadiene latex (CP620NA, Dow) was added and the pH adjusted to 9. The dispersion was dried in the same manner as that in Example 1. The same process was used to prepare composites containing 10%, 15%, and 20% of soy protein concentrate. After drying, the mechanical properties were measured as described in Example 1. The mechanical properties of this composite are shown in FIG. 1C, FIG. 2, FIG. 3C, FIG. 4C, and FIG. 5C.

EXAMPLE 10

Comparative Example

Preparation of 10 % Carbon Black Composite.

Figure 1D:
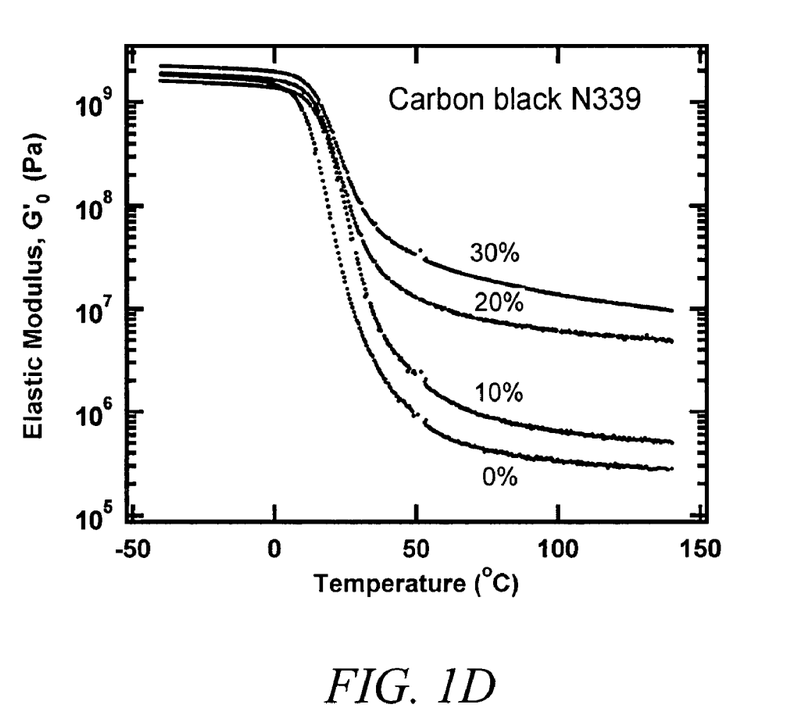
Figure 5D:
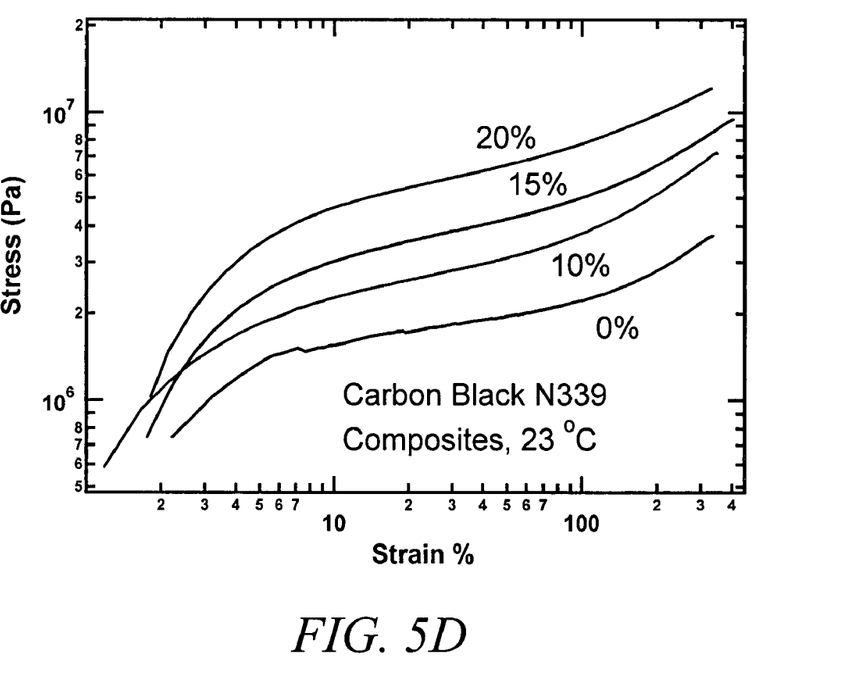

100-gm of carbon black grade N-339 and 3.2 gm of sodium lignin sulfonate (Vanisperse CB, LIGNOTECH USA) were homogenized at 10,000 rpm in 540 gm of water for 1 hour. The resulting carbon black dispersion had a pH of 9.7 and a solid fraction of 15.9%. 63.3 gm of 15.9% carbon black dispersion was mixed with 338 gm of 26.8% carboxylated styrene-butadiene latex (CP620NA, Dow) and the pH adjusted to 9. The dispersion was dried in the same manner as that in Example 1. After drying, the mechanical properties were measured as described in Example 1. The mechanical properties of this composite are shown in FIG. 1D, FIG. 2, and FIG. 5D.

EXAMPLE 11

Comparative Example

Preparation of 15% Carbon Black Composite.

A 100-gm sample of carbon black grade N-339 and 3.2 gm of sodium lignin sulfonate (Vanisperse CB, LIGNOTECH USA) were homogenized at 10,000 rpm in 540 gm of water for 1 hour. The resulting carbon black dispersion had a pH of 9.7 and a solid fraction of 15.9%. 75.6 gm of 15.9% carbon black dispersion were mixed with 324.6 gm of 21% carboxylated styrene-butadiene latex (CP620NA, Dow) and the pH adjusted to 9. The dispersion was dried in the same manner as that in Example 1. After drying, the mechanical properties were measured as described in Example 1. The mechanical properties of this composite are shown in FIG. 1D, FIG. 2, and FIG. 5D.

EXAMPLE 12

Comparative Example

Preparation of 20 % Carbon Black Composite.

A 20.1-gm sample of carbon black grade N-339 and 0.78 gm of sodium lignin sulfonate (Vanisperse CB, LIGNOTECH USA) was homogenized at 10,000 rpm in 80 gm of water for 1 hour. The resulting carbon black dispersion had a solid fraction of 20.7%. 17.6 gm of 20.7% carbon black dispersion was mixed with 190.6 gm of 37.4% carboxylated styrene-butadiene latex (CP620NA, Dow) and the pH adjusted to 9. The dispersion was dried in the same manner as that in Example 1. After drying, the mechanical properties are measured as described in Example 1. The mechanical properties of this composite are shown in FIG. 1D, FIG. 2, FIG. 3D, and FIG. 5D.

EXAMPLE 13

Comparative Example

Preparation of 30 % Carbon Black Composite.

Figure 4A:
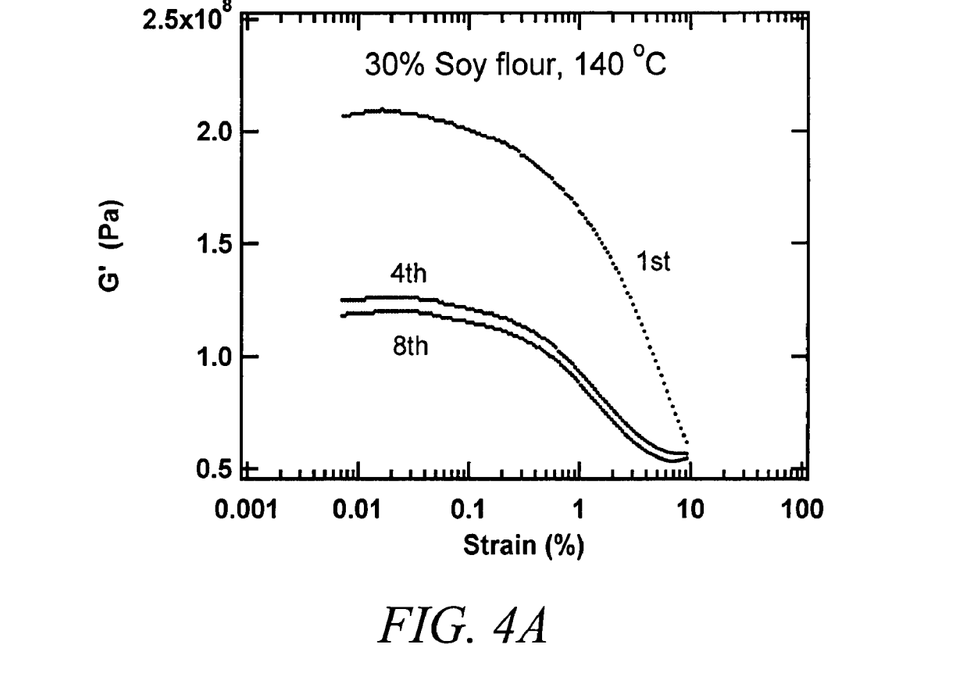
Figure 4B:
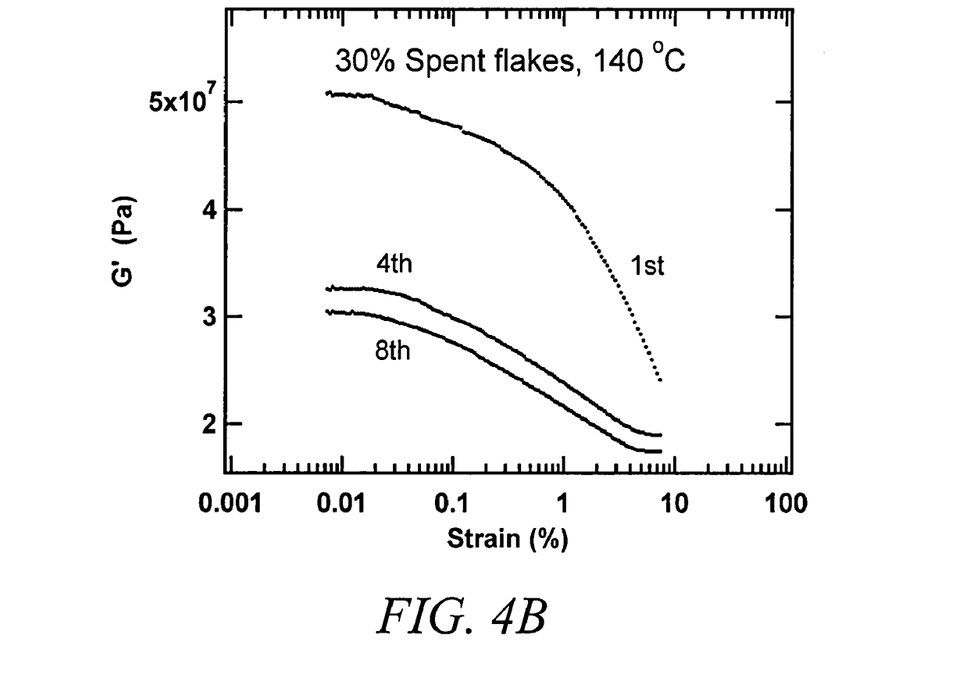
Figure 4C:
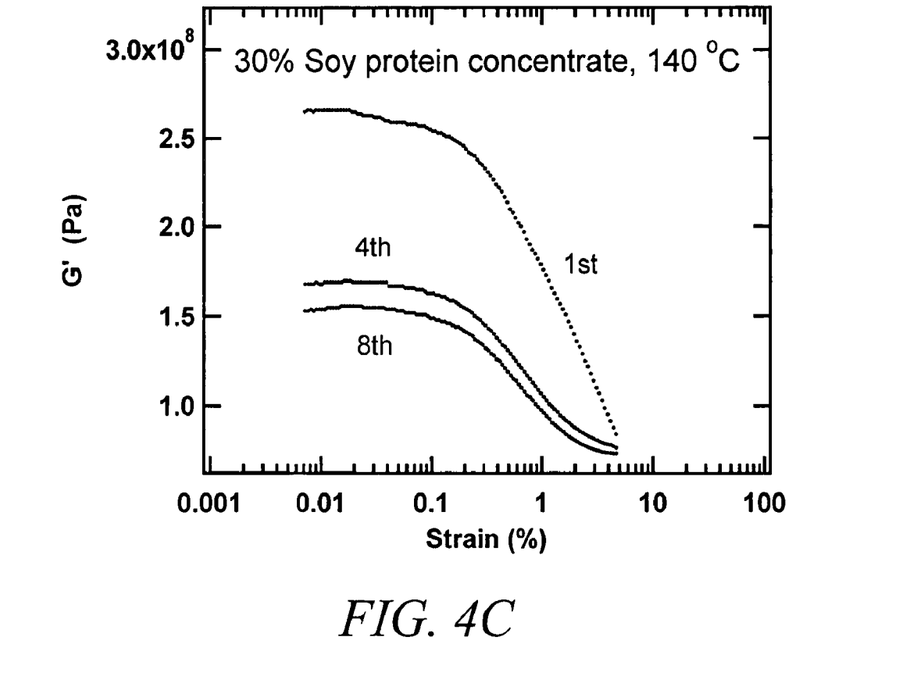
Figure 4D:
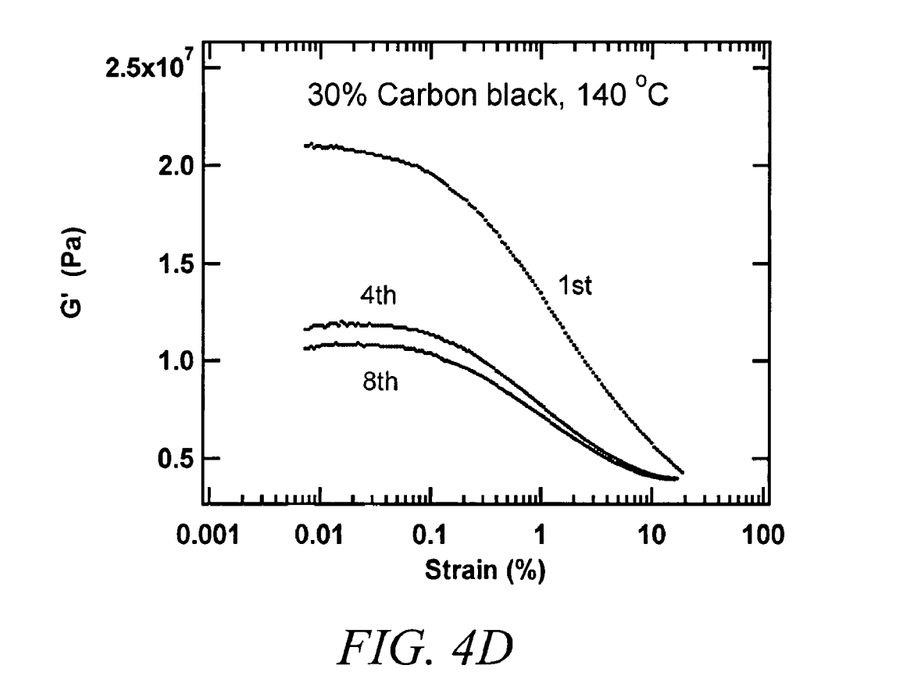

A 100-gm sample of carbon black grade N-339 and 3.2 gm of sodium lignin sulfonate (Vanisperse CB, LIGNOTECH USA) were homogenized at 10,000 rpm in 540 gm of water for 1 hour. The resulting carbon black dispersion had a pH of 9.7 and a solid fraction of 15.9%. 189.3 gm of 15.9% carbon black dispersion was mixed with 190.7 gm of 37% carboxylated styrene-butadiene latex (CP620NA, Dow) and the pH adjusted to 9. The dispersion was dried in the same manner as that in Example 1. After drying, the mechanical properties were measured as described in Example 1. The mechanical properties of this composite are shown in FIG. 1D, FIG. 2, and FIG. 4D.

EXAMPLE 14

Comparative Example

Preparation of 10% Soy Protein Isolate Composite.

A 10.5-gm sample of 95.6% soy protein isolate (Profam 781, ADM) was dispersed in 208 gm of water and cooked at pH 9 and 55° C. for 1 hour. 181 gm of 49.7% caboxylated styrene-butadiene latex (CP620NA, Dow) was added and the pH adjusted to 9. The dispersion was dried in the same manner as that in Example 1. After drying, the mechanical properties were measured as described in Example 1. The mechanical properties of this composite are shown in FIG. 2.

EXAMPLE 15

Comparative Example

Preparation of 15% Soy Protein Composite.

A 15.8-gm sample of 95.4% soy protein isolate (Profam 781, ADM) was dispersed in 220 gm of water and cooked at pH 9 and 55° C. for 1 hour. 172 gm of 49.7% caboxylated styrene-butadiene latex (CP620NA, Dow) was added and pH adjusted to 9. The dispersion was dried in the same manner as that in Example 1. After drying, the mechanical properties were measured as described in Example 1. The mechanical properties of this composite are shown in FIG. 2.

EXAMPLE 16

Comparative Example

Preparation of 20% Soy Protein Composite.

20.9-gm sample of 95.6% soy protein isolate (Profam 781, ADM) was dispersed in 218 gm of water and cooked at pH 9 and 55° C. for 1 hour. 161 gm of 49.7% caboxylated styrene-butadiene latex (CP620NA, Dow) was added and the pH adjusted to 9. The dispersion was dried in the same manner as that in Example 1. After drying, the mechanical properties were measured as described in Example 1. The mechanical properties of this composite are shown in FIG. 2.

EXAMPLE 17

Comparative Example

Preparation of 30% Soy Protein Composite.

A 31.4-gm sample of 95.6% soy protein isolate (Profam 781, ADM) was dispersed in 250 gm of water and cooked at pH 9 and 55° C. for 1 hour. 140.9 gm of 49.7% caboxylated styrene-butadiene latex (CP620NA, Dow) was added and the pH adjusted to 9. The dispersion was dried in the same manner as that in Example 1. After drying, the mechanical properties are measured as described in Example 1. The mechanical properties of this composite are shown in FIG. 2.

EXAMPLE 18

Comparative Example

Preparation of 40% Soy Protein Composite.

A 41.8-gm sample of 95.6% soy protein isolate (Profam 781, ADM) was dispersed in 237 gm of water and cooked at pH 9 and 55° C. for 1 hour. 120.7 gm of 49.7% caboxylated styrene-butadiene latex (CP620NA, Dow) was added and the pH adjusted to 9. The dispersion was dried in the same manner as that in Example 1. After drying, the mechanical properties are measured as described in Example 1. The mechanical properties of this composite are shown in FIG. 2.

Having thus described the invention, numerous changes and modifications thereof will be readily apparent to those having ordinary skill in the art without departing from the spirit or scope of the invention. For example, the compositions of the present invention also can contain other fillers, colorants, stabilizers, and the like.

I claim:

1. A composite comprising (1) an ionic polymer and (2) a protein and carbohydrate-containing soy vegetable material, wherein said soy vegetable material contains substantially no starch and is selected from the group consisting of an oilseed residue remaining after removal of oil from said oil seed, soy spent flake, defatted soy flour, and soy protein concentrate, and said ionic polymer contains a sufficient number of ionic functional groups capable of dispersing said polymer in water to form an aqueous emulsion.

2. The composite of claim 1, wherein said composite is characterized by having a higher modulus when compared with said ionic polymer alone.

3. The composite of claim 1, wherein said vegetable material comprises 10-85% protein and 15-90% carbohydrate.

4. The composite of claim 1, wherein said vegetable material comprises 20-70% protein and 30-80% carbohydrate.

5. The composite of claim 1, wherein said vegetable material is selected from the group consisting of soy spent flake, defatted soy flour, and soy protein concentrate.

6. The composite of claim 1, wherein said ionic polymer contains a functional group selected from (1) carboxylic acid groups or salts thereof; (2) sulfonic acid groups or salts thereof; and (3) mixtures of said carboxylic acids, sulfonic acids or salts thereof.

7. The composite of claim 6, wherein said ionic polymer comprises polymerized monomer units, less than 30 weight percent of which contain said functional group.

8. The composite of claim 7, wherein said ionic polymer comprises at least 70 weight percent of hydrocarbon monomer units, in addition to said monomer units containing said functional group.

9. A Product produced by the method comprising:
  a. mixing (1) an ionic polymer and (2) a protein and carbohydrate-containing soy vegetable material in the presence of water to obtain an aqueous dispersion, wherein said soy vegetable material contains substantially no starch and is selected from the group consisting of an oilseed residue remaining after removal of oil from said oil seed, soy spent flake, defatted soy flour, and soy protein concentrate, and said ionic polymer contains a sufficient number of ionic functional groups capable of dispersing said polymer in water to form an aqueous emulsion;
  b. removing at least some of said water from said aqueous dispersion; and
  c. recovering said composite as a solid from said aqueous dispersion.

10. A product of claim 9, wherein said vegetable material is selected from the group consisting of soy spent flake, defatted soy flour, and soy protein concentrate.

11. A product of claim 9, wherein said ionic polymer contains a functional group selected from (1) carboxylic acid groups or salts thereof; (2) sulfonic acid groups or salts thereof; and (3) mixtures of said carboxylic acids, sulfonic acids or salts thereof.

* * * * *